United States Patent
Stacy, II

(10) Patent No.: US 8,577,557 B2
(45) Date of Patent: Nov. 5, 2013

(54) SYSTEMS AND METHODS FOR DETECTING JACK CONTACT WITH GROUND

(75) Inventor: Edward Curtis Stacy, II, Evansville, IN (US)

(73) Assignee: Flanders Electric Motor Service, Inc., Evansville, IN (US)

( * ) Notice: Subject to any disclaimer, the term of this patent is extended or adjusted under 35 U.S.C. 154(b) by 0 days.

(21) Appl. No.: 13/587,490

(22) Filed: Aug. 16, 2012

(65) Prior Publication Data

US 2012/0310488 A1    Dec. 6, 2012

Related U.S. Application Data

(63) Continuation of application No. 12/616,358, filed on Nov. 11, 2009, now Pat. No. 8,265,833.

(51) Int. Cl.
*B60S 9/00* (2006.01)

(52) U.S. Cl.
USPC ............................................. 701/49; 254/418

(58) Field of Classification Search
USPC ............................ 701/49, 50, 124; 280/6.15, 280/6.153–6.156, 5.514, 5.507; 254/418, 254/420
See application file for complete search history.

(56) References Cited

U.S. PATENT DOCUMENTS

| | | |
|---|---|---|
| 2,933,143 A | 4/1960 | Robinson et al. |
| 3,856,152 A | 12/1974 | Parrett et al. |
| 3,874,515 A | 4/1975 | Leigh |
| 4,084,830 A | 4/1978 | Daniel, Jr. et al. |
| 4,597,584 A | 7/1986 | Hanser |
| 5,890,721 A | 4/1999 | Schneider et al. |
| 6,351,696 B1 | 2/2002 | Krasny et al. |
| 6,885,924 B2 | 4/2005 | Ford et al. |
| 7,226,057 B2 | 6/2007 | Eichhorn et al. |
| 8,028,973 B2 | 10/2011 | Ford et al. |
| 8,215,673 B2 * | 7/2012 | Ford et al. ................ 280/763.1 |
| 8,382,069 B2 * | 2/2013 | Alguera et al. ............ 254/424 |
| 2004/0046337 A1 | 3/2004 | Sproatt et al. |
| 2006/0226612 A1 | 10/2006 | Smith et al. |

OTHER PUBLICATIONS

International Search Report dated Jan. 12, 2011 for PCT Application No. PCT/US2010/055798, 3 pages.
Written Opinion of the International Searching Authority dated Jan. 12, 2011 for PCT Application No. PCT/US2010/055793, 4 pages.
Office Action dated May 22, 2012 for U.S. Appl. No. 12/616,358, 11 pages.

* cited by examiner

*Primary Examiner* — Dalena Tran
(74) *Attorney, Agent, or Firm* — Fennemore Craig, P.C.

(57) ABSTRACT

A system for determining when one or more jacks on a vehicle have contacted the ground. The system includes at least one of a pitch sensor that senses a pitch angle of the vehicle and a roll sensor that senses a roll angle of the vehicle. A jack extension system operatively associated with the vehicle jacks extends and retracts the one or more jacks on the vehicle. A control system operatively associated with the pitch sensor, the roll sensor, and the jack extension system monitors the pitch and roll sensors to determine the pitch and roll angles of the vehicle. The control system operates the jack extension system to lower the jacks to the ground and determines that the jacks have contacted the ground based on detected changes in the pitch and roll angles of the vehicle.

3 Claims, 8 Drawing Sheets

SYSTEMS AND METHODS FOR DETECTING JACK CONTACT WITH GROUND

CROSS-REFERENCE TO RELATED APPLICATION

This application is a continuation of co-pending U.S. application Ser. No. 12/616,358, filed on Nov. 11, 2009, which is incorporated herein by reference for all that it discloses.

TECHNICAL FIELD

This invention relates to vehicles having stabilizing jacks in general and more specifically to methods and systems for detecting when the stabilizing jacks have contacted the ground.

BACKGROUND

Numerous kinds of vehicles having retractable jacks for stabilization and/or lifting are known in the art and are used in a wide range of applications. Typically, the stabilizing jacks are hydraulically operated and are moveable between retracted and extended positions. When in the retracted position, the stabilizing jacks are out of the way and allow the vehicle to move about without interference from the jacks. When in the extended position, the stabilizing jacks contact the ground and support at least a portion, if not the entirety, of the vehicle. In certain applications, the jacks may be used merely to stabilize the vehicle, whereas in other applications, the jacks may lift all or a portion of the vehicle to level the vehicle or otherwise position the vehicle in a desired attitude.

While such stabilizing jack systems may be manually controlled, many jack systems are partially- or fully-automated, and use a jack deployment system to automatically extend or deploy the jacks until they provide the desired degree of lift or stabilization. A typical jack deployment system uses a ground sensing system to first sense or detect when the jacks have contacted the ground. Thereafter, the jack deployment system may use an attitude control system to further extend the jacks until the vehicle has achieved the desired attitude (e.g., level or some other attitude).

While the ground sensing systems used by such jack deployment systems are generally capable of determining when the jacks have contacted the ground, they are not without their problems. For example, one type of ground sensing system utilizes a proximity sensor contained within the jack housing. As the jack contacts the ground, a reference element inside the sensor housing moves. The proximity sensor detects the movement of the reference element and provides a suitable indication to the jack deployment system that the jack has contacted the ground. While such proximity sensor systems are generally inexpensive and easy to service, they are prone to failure as a result of clogging caused by grease and/or mud build-up in and around the jack housing.

Another type of ground detection system uses pressure sensors or transducers to detect the hydraulic pressure inside the jack cylinder. When the jack contacts the ground, the hydraulic pressure in the cylinder increases, thereby providing the jack deployment system with an indication that the jack has contacted the ground. While such pressure sensing systems are free of many of the problems associated with proximity sensor systems, they have proven to be no panacea, and also suffer from various drawbacks and disadvantages.

For example, most hydraulically operated jack systems utilize one or more holding valves to hold the jacks at certain positions. The holding valves are adjustable and are usually set-up by a maintenance technician to provide the desired holding characteristics. However, if the holding valve pressure is set too high, the ground detection system may provide a false indication of ground contact. That is, the pressure required to overcome the jack holding valve may be sufficiently high so as to cause the ground contact system to interpret the high pressure as ground contact when in fact the jack has yet to contact the ground.

Still another problem is that the back pressure caused by the jack holding valve typically varies depending on the temperature of the hydraulic fluid. When the fluid is cold, the pressure required to overcome the valve will usually increase, again leading to the possibility of a false ground contact signal. Yet another disadvantage associated with pressure sensing systems is that the various components are relatively expensive and may be difficult to service or may create other maintenance problems.

Besides the reliability and maintenance issues that are associated with the various kinds of ground detection systems, the failure of the ground sensing system to detect when the jacks have contacted the ground may result in other problems, such as an unsafe vehicle attitude or even vehicle inversion. That is, absent a ground detection signal, the jack deployment system may continue to extend the jack even though the jack has already contacted the ground. Unchecked jack extension will almost certainly result in an unsafe vehicle attitude and may even cause the vehicle to tip or roll over, particularly if the vehicle is on uneven or sloped ground. In other failure modes, a "false positive," i.e., an indication of jack ground contact when in fact none has occurred, may prevent the jack deployment system from further extending the jacks, thereby preventing the vehicle from achieving the desired attitude or degree of stabilization.

SUMMARY OF THE INVENTION

An embodiment of a method for determining when at least one jack on a vehicle has contacted the ground, the vehicle including at least a first jack mounted to a first end of the vehicle and a pair of jacks mounted to a second end of the vehicle, comprises: determining an initial pitch angle before any of the jacks have contacted the ground; combining the initial pitch angle with a pitch setpoint value to create a resultant pitch value; sensing at least one of a pitch angle of the vehicle and a roll angle of the vehicle; extending the at least one jack, the at least one jack comprising the first jack mounted at the first end of the vehicle while monitoring the pitch angle of the vehicle; and determining that the first jack has contacted the ground by comparing the monitored pitch angle of the vehicle with the resultant pitch value.

A system for determining when one or more jacks on a vehicle have contacted the ground may include a pitch sensor operatively associated with the vehicle so that the pitch sensor senses a pitch angle of the vehicle and a roll sensor operatively associated with the vehicle that senses a roll angle of the vehicle. A jack extension system operatively associated with the vehicle jacks extends and retracts the one or more jacks on the vehicle. A control system operatively associated with the pitch sensor, the roll sensor, and the jack extension system monitors the pitch and roll sensors to determine the pitch and roll angles of the vehicle. The control system operates the jack extension system to lower the jacks to the ground and determines that the jacks have contacted the ground based on detected changes in the pitch and roll angles of the vehicle.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

One embodiment of a system 10 for detecting jack contact with the ground is shown and described herein as it may be used on a drill rig 12 of the type commonly used in mining and quarrying operations to drill blastholes (not shown). Alternatively, the system 10 may be used in any of a wide range of other applications and other vehicle types, as would become apparent to persons having ordinary skill in the art after having become familiar with the teachings provided herein. Consequently, the present invention should not be regarded as limited to the particular vehicle (e.g., drill rig 12) and application (e.g., blasthole drilling) shown and described herein.

Figure 1:
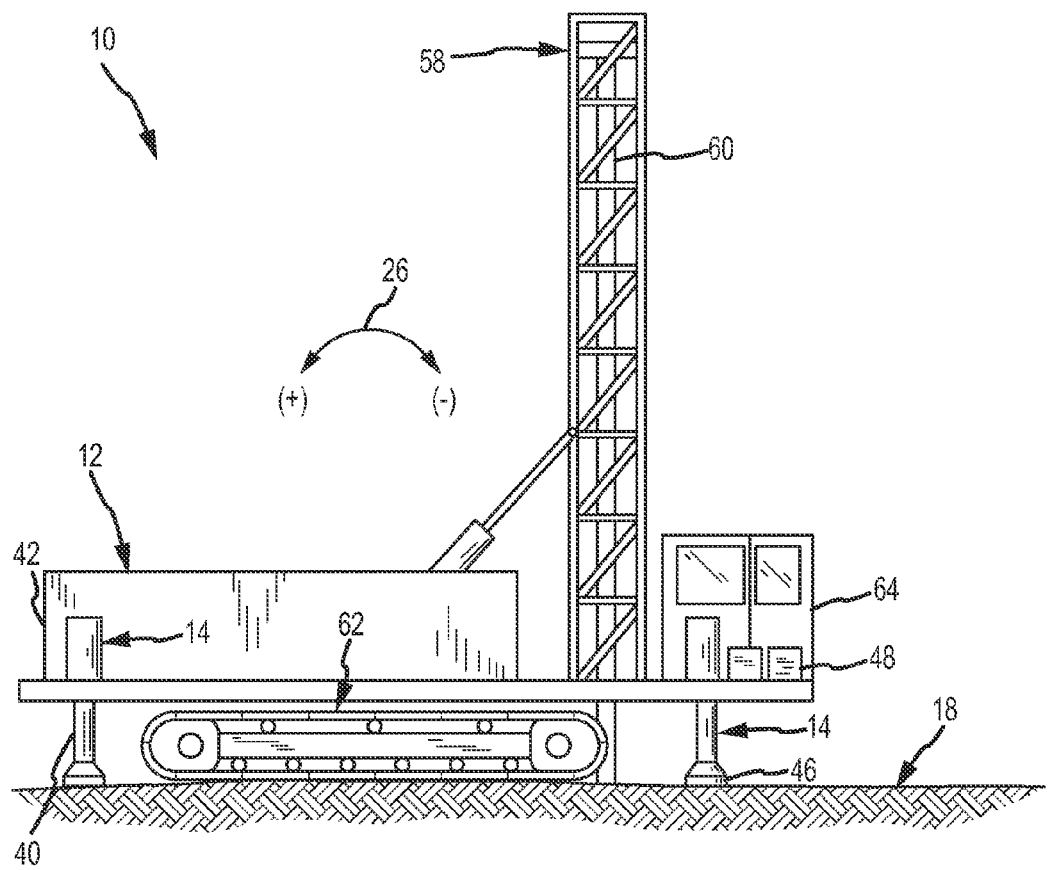
FIG. 1 is a side view in elevation of a drill rig embodying the systems and methods of the present invention.
Figure 2:
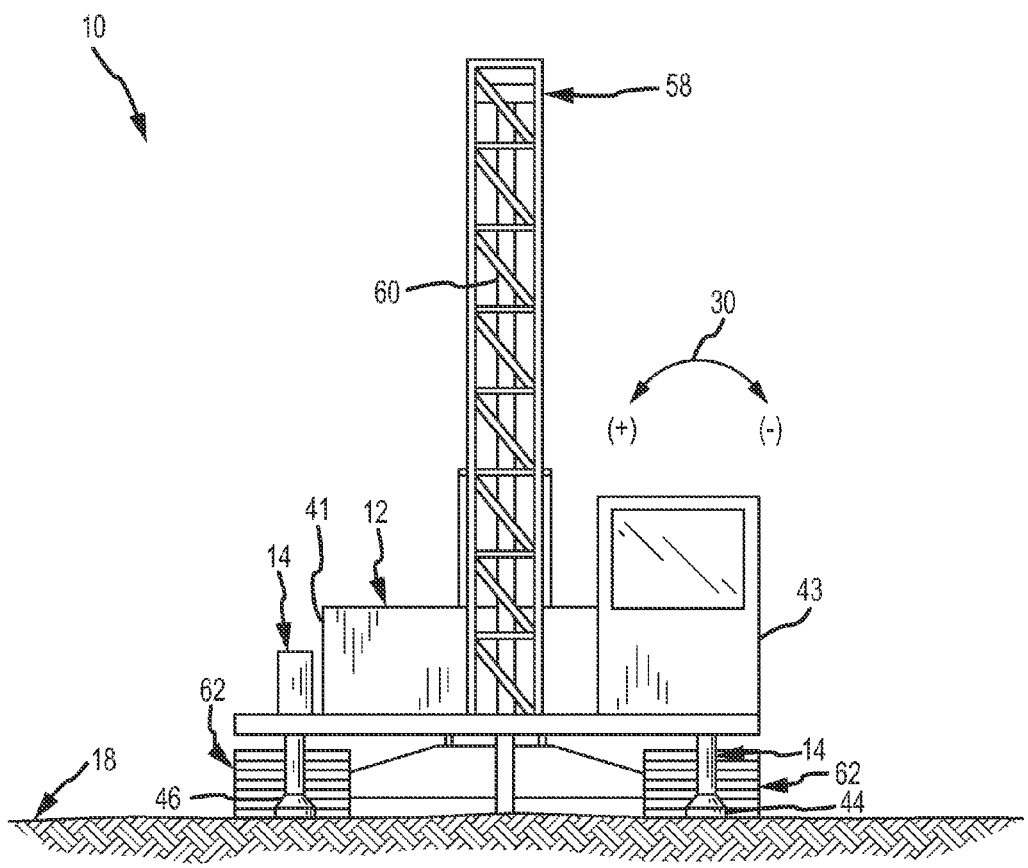
FIG. 2 is a drill end view in elevation of the drill rig illustrated in FIG. 1.
Figure 3:
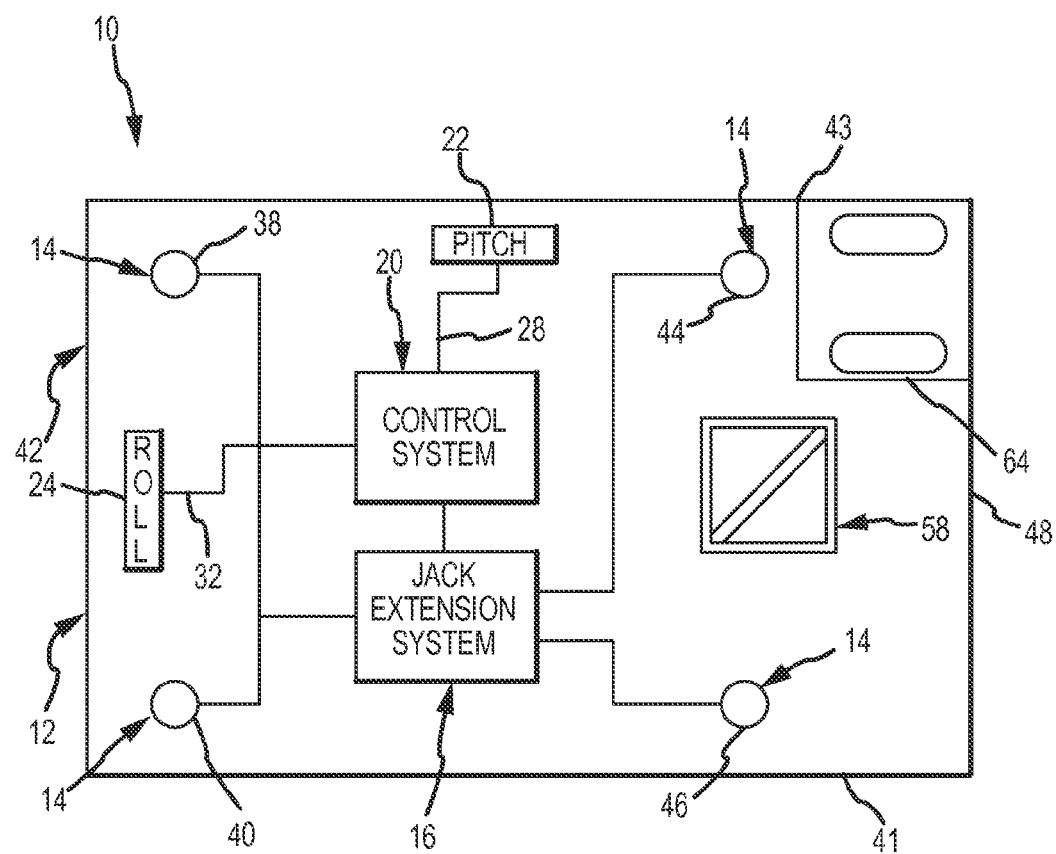
FIG. 3 is a block diagram of one embodiment of a system for detecting jack contact with the ground.

Referring now primarily to FIGS. 1-3, drill rig 12 may be provided with a plurality of jacks 14 that may be operated or controlled by a jack extension system 16. In the example embodiment shown and described herein, jack extension system 16 of drill rig 12 may comprise an automated or semi-automated jack extension system that may be operated to automatically extend the various jacks 14 on drill rig 12. In such an embodiment, the system 10 for detecting jack contact with the ground is operatively associated with the jack extension system 16 and provides to the jack extension system 16 an indication that the jacks 14 have contacted the ground or surface 18. After this ground contact indication has been provided, the jack extension system 16 may be operated to further extend the jacks 14 until the drill rig 12 is level or has achieved the desired attitude.

More specifically, the system 10 for detecting jack contact with the ground may comprise a control system 20 that is operatively associated with the jack extension system 16. Control system 20 is also operatively connected to a pitch sensor 22 and a roll sensor 24 that are mounted to drill rig 12. Pitch sensor 22 senses a pitch attitude or angle 26 (FIG. 1) of drill rig 12 and produces a pitch output signal that is related to the pitch angle 26. Similarly, roll sensor 24 senses a roll attitude or angle 30 (FIG. 2) and produces a roll output signal 32 that is related to the roll angle 30 of drill rig 12.

Figure 4:
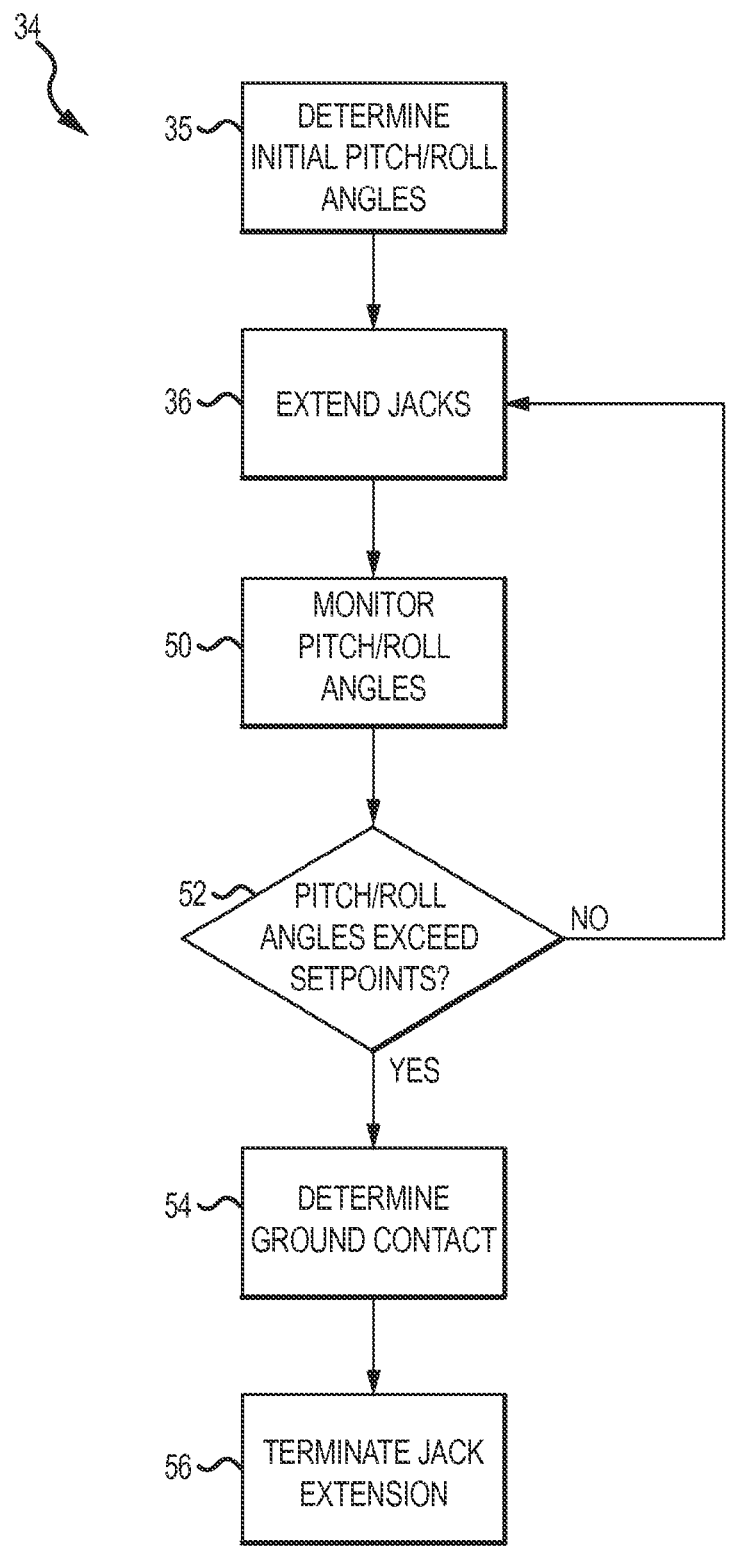
FIG. 4 is a flow chart of one embodiment of a method for detecting jack contact with the ground.

Referring now primarily to FIG. 4, the system 10 may be programmed or configured to implement a method 34 to determine when at least one jack 14 has contacted the ground 18. As a first step 35 in method 34, control system 20 determines or senses at least one of an initial pitch angle 26 or roll angle 30 of the drill rig 12. The control system 20 will implement step 35 at the start of the stabilization and/or leveling process and in any event before any of the jacks 14 have contacted the ground. Generally speaking, control system 20 will sense both the initial pitch angle 26 and the initial roll angle 30 during step 35, because both initial angles will be needed for the subsequent ground detection process. However, and as will be described in further detail below, the control system 20 need only sense the initial angle (i.e., the initial pitch angle 26 or the initial roll angle 30) that is correlated with the particular jack or jacks 14 that are being extended. That is, in certain situations the control system 20 may not necessarily determine or sense both the initial pitch angle 26 and the initial roll angle 30 at step 35.

After the initial pitch and/or roll angles 26 and/or have been determined, control system 20 may instruct the jack extension system 16 to begin extending the jacks 14 at step 36. Generally speaking, jack extension system 16 will only extend one jack 14 at a time, and system 10 will provide a suitable ground contact indication to the jack extension system 16 when each jack 14 has contacted the ground. However, in other embodiments the arrangement may be such that jack control system 16 extends two or more jacks 14 at a time.

For example, in the embodiment shown and described herein, vehicle jacks 14 comprise a pair of jacks 38 and 40 mounted to a first or non-drill end 42 of drill rig 12 that are controlled by a single hydraulic valve (not shown). Thus, when operated by jack extension system 16, both the non-drill end jacks 38 and 40 will extend and retract together. However, another pair of jacks 44 and 46 mounted to a second or drill end 48 of drill rig 12 are independently controllable. That is, the jack extension system 16 can extend and retract the drill end jacks 44 and 46 independently. In such an embodiment, then, the system 10 will provide a ground contact indication when any one of two jacks 14 operating together (e.g., non-drill end jacks 38 and 40) contact the ground 18. For the jacks that are independently controllable (e.g., jacks 44 and 46), the system will provide a ground contact indication when each respective jack contacts the ground 18.

Regardless of whether the various jacks 14 are independently controllable (e.g., can be extended singly or in pairs), control system 20 continues to monitor, at step 50, the pitch and/or roll angles 26 and/or 30 as the jack or jacks are being extended. If the pitch and/or roll angles 26 and/or 30 have not exceeded predetermined setpoints for the pitch and roll angles 26 and 30, as determined at step 52, then control system 20 will continue to extend the jack(s) 14, i.e., control system will continue to perform steps 36, 50, and 52, as depicted in FIG. 4. However, once the pitch and/or roll angles 26 and/or 30 exceed their respective setpoints, then control system 20 determines at step 54 that the jack(s) 14 being extended has contacted the ground 18. Thereafter, control system 20 may instruct jack extension system 18 to terminate jack extension at step 56.

Method 34 may be repeated for each additional jack 14 that is to be extended, except that the initial pitch and roll angles 26 and 30 need not be sensed (e.g., at step 35) for subsequent jack extensions.

After each jack 14 has been extended until it has contacted the ground 18, as determined by the ground contact signals provided to the jack extension system 16 by the control system 20, jack extension system 16 may thereafter be operated to further extend the jacks 14 until the drill rig 12 has been leveled or has otherwise reached the desired attitude.

A significant advantage of the present invention is that it provides a reliable indication of ground contact without the drawbacks and disadvantages of other types of systems. For example, because the present invention does not require the use of proximity sensors in the jack housings, it is free of the reliability and maintenance issues typically associated with such systems. The present invention is also free of the problems and issues typically associated with pressure sensing systems, because it does not rely on the measurement of hydraulic pressure to determine when the various jacks have contacted the ground.

Another advantage of the present invention is that the pitch and roll sensors used to sense or measure the pitch and roll angles of the vehicle are typically mechanically robust, highly reliable, and comparatively inexpensive. Still further, the pitch and roll sensors utilized in one embodiment are relatively easy to troubleshoot and can usually be tested, in-situ, by the control system 20 to verify proper operation before the jack extension operation begins. Of course, the ability to verify the proper operation of the pitch and roll sensors in advance of the jack extension process should substantially reduce the possibility of unchecked jack extension resulting from sensor failure.

Still yet another advantage of the present invention is that it can be easily retro-fitted to existing vehicles having partially- or fully-automated jack extension systems. Indeed, in certain applications, the present invention may be able to use many of the same hardware components already associated with such systems.

Having briefly described one embodiment of the systems and methods for determining jack contact with the ground, as well as some of the more significant features and advantages thereof, various exemplary embodiments of the systems and methods will now be described in detail. However, before proceeding with the detailed description, it should be noted that while the systems and methods are shown and described herein as they could be implemented on a blasthole drill rig 12 of the type commonly used in mining and quarrying operations, they could be used on other vehicle types and in other applications, as would become apparent to persons having ordinary skill in the art after having become familiar with the teachings provided herein. Consequently, the present invention should not be regarded as limited to the particular vehicle types, applications, and environments shown and described herein.

Referring back now to FIGS. 1-3, one embodiment of a system 10 for detecting jack contact with the ground is shown and described herein as it may be used on a blasthole drill rig 12 of the type commonly used in mining and quarrying operations to drill blastholes (not shown). Blasthole drill rig 12 may comprise a retractable derrick 58 suitable for supporting a drill string 60 used to drill or form the blastholes. In the embodiment shown and described herein, drill rig 12 is mounted on a pair of crawler tracks 62 that allow the drill rig 12 to be moved or "trammed" from place-to-place to drill the various blastholes. In an embodiment where the drill rig 12 is to be manned, it may also be provided with an operator cab 64 to allow a drill rig operator (not shown) to monitor and/or operate the various systems and devices of drill rig 12.

Of course, drill rig 12 may also be provided with various other components and systems, such as one or more power plants, electrical systems, hydraulic systems, pneumatic systems, etc. (not shown), that may be required or desired for the operation of the drill rig 12. However, because such other components and systems that may comprise drill rig 12 are well-known in the art, and because a detailed description of such other systems and components is not required to understand or practice the systems and methods of the present invention, the various other components and systems of drill rig 12 that are not directly related to the systems and methods of the present invention will not be described in further detail herein.

Drill rig 12 is also provided with a plurality of jacks 14 that may be used to stabilize and/or lift drill rig to the desired attitude before the drilling operation begins. In the embodiment shown and described herein, the various jacks 14 are hydraulically powered and are controlled by a jack extension system 16. Jack extension system 16 extends and retracts the jacks 14 until they make initial contact with the ground 18 (i.e., as determined by the system and method of the present invention). Thereafter, jack extension system 16 may further extend the various jacks 14 to level the drill rig 12 or otherwise lift it to the desired attitude.

With reference primarily to FIG. 3, the various jacks 14 of drill rig 12 are arranged in pairs. More specifically, a first pair of jacks 38 and 40 are mounted to the first or "non-drill end" 42 of drill rig 12, whereas a second pair of jacks 44 and 46 are mounted to the second or "drill end" 48 of drill rig 12. As was briefly described above, the two "non-drill end" jacks 38 and 40 are controlled by a single hydraulic valve and operate together. That is, when operated by jack extension system 16, both jacks 38 and 40 will extend or retract together. In contrast, the "drill end" jacks 44, 46 are independently controlled. That is, the jack extension system 16 may extend and retract the drill end jacks 44 and 46 independent of one another. The fact that, in one embodiment, the non-drill end jacks 38 and 40 cannot be independently controlled is taken into account in the method for operating the non-drill end jacks 38 and 40, as will be described below.

The jack extension system 16 may comprise any of a wide range of systems and devices that are now known in the art or that may be developed in the future that are, or would be, suitable for controlling the various jacks in the manner described herein and for receiving the ground contact indication from control system 20. Consequently, the present invention should not be regarded as limited to any particular type of jack extension system 16. However, by way of example, in one embodiment, the jack extension system 16 may comprise a portion of a computerized drill control system (not shown) that is operatively connected to the various other systems and components associated with drill rig 12, including the hydraulic system that is used to extend and retract the jacks 14.

The control system 20 may comprise a similar type of computer system that is configured to communicate with jack extension system 16 provided on drill rig 12. Indeed, and depending on the particular vehicle, the control system 20 may comprise a portion of the computerized control system used to operate the various systems and devices of the vehicle. Alternatively, of course, control system 20 could comprise a separate system.

In any event, i.e., regardless of whether control system 20 comprises an independent system or whether control system 20 comprises a portion of an existing vehicle control system, control system 20 is programmed to implement the methods described herein and to interface with the particular jack extension system 16 on the vehicle. Control system 20 also may be configured to interface with any other system or device of drill rig 12, as may be required or desired in any particular application, as would become apparent to persons having ordinary skill in the art after having become familiar with the teachings provided herein.

Still referring to FIG. 3, control system 20 may also be operatively connected to a pitch sensor 22 and a roll sensor 24. Pitch sensor 22 may be mounted to any convenient location on drill rig 12 so that it senses or detects the pitch angle 26 of drill rig 12. Pitch sensor 22 produces a pitch output signal 28 that is related to the pitch angle 26 of drill rig 12. See FIG. 1. In one embodiment, pitch sensor 22 senses the pitch angle 26 of drill rig 12 relative to horizontal, which is designated a zero pitch angle. Pitch angles 26 toward the non-drill end 42 of drill rig 12 are assigned positive (+) pitch angles, whereas pitch angles toward the drill end 48 of drill rig 12 are assigned negative (−) pitch angles, as designated in FIG. 1. Alternatively, the opposite sign convention could also be used. The pitch output signal 28 may be provided in any convenient units, such as degrees or radians. Alternatively, the pitch output signal could be dimensionless. By way of example, in one embodiment, the pitch output signal 28 is provided to control system 20 in units of degrees.

Pitch sensor 22 may comprise any of a wide variety of pitch sensors that are now known in the art or that may be developed in the future that are, or would be, suitable for the intended application. Consequently, the present invention should not be regarded as limited to any particular pitch sensor. However, by way of example, in one embodiment, pitch sensor 22 comprises a single axis analog tilt sensor, part no. PN72162000-045, available from Measurement Specialties of Hampton, Va. (US) and sold under the trademark "ACCUSTAR® IP-66 Clinometer."

Roll sensor 24 may be mounted to any convenient location on drill rig 12 so that it senses or detects the roll angle 30 of drill rig 12. In a manner similar to the pitch sensor 22, roll sensor 24 produces a roll output signal 32 that is related to the roll angle 30 of drill rig 12, as best seen in FIG. 2. In the embodiment shown and described herein, roll sensor 24 senses the roll angle 30 of drill rig relative to horizontal, which is designated a zero roll angle. Roll angles 30 toward a non-cab side 41 of drill rig 12 are assigned positive (+) roll angles, whereas roll angles toward a cab side 43 of drill rig 12 are assigned negative (−) roll angles, as depicted in FIG. 2. Of course, the opposite sign convention could also be used. As was the case for the pitch output signal 28, the roll output signal 32 may be provided in any convenient units, such as degrees or radians. Alternatively, the roll output signal 32 could be dimensionless. By way of example, in one embodiment, the roll output signal 32 is provided to control system 20 in units of degrees.

Roll sensor 24 may comprise any of a wide variety of roll sensors that are now known in the art or that may be developed in the future that are, or would be, suitable for the intended application. Consequently, the present invention should not be regarded as limited to any particular roll sensor. However, by way of example, in one embodiment, roll sensor 24 comprises a single axis analog sensor, part no. PN72162000-045, available from Measurement Specialties of Hampton, Va. (US) and sold under the trademark "ACCUSTAR® IP-66 Clinometer."

Referring now primarily to FIG. 4, the system 10 may implement a method 34 for determining when at least one of the jacks 14 provided on drill rig 12 has contacted the ground 18. A first step 35 of method 34 involves the determination of the initial pitch angle 26 and/or the initial roll angle 30 of the vehicle or drill rig 12. In this regard it should be noted that in most applications, the control system 20 will sense or determine both the initial pitch angle 26 and the initial roll angle 30 of the vehicle (e.g., drill rig 12), because it will be desired to extend all of the jacks 14, thus affecting both the pitch and roll angles 26 and 30 of the drill rig 12. However, it should be noted that in certain circumstances it may only be necessary to sense the angle that is correlated with the particular jacks 14 that are to contact the ground. For example, in an embodiment wherein two jacks 14, such as non-drill end jacks 38 and 40, that are positioned on the same end (e.g., the non-drill end) of drill rig 12 and are also to be extended together, then it may be possible to configure the system 10 so that control system 20 senses only the initial pitch angle 26, as the pitch angle 26 is strongly correlated with the extension of that pair of jacks 14. However, this is a limited application and will not generally be undertaken in most situations.

Once the control system 20 has sensed the initial pitch angle 26 and roll angle 30 of drill rig 12, control system 20 may store those initial angles in an appropriate memory system (not shown) for later access and processing, as will be described below. The control system 20 may then execute step 36 by commanding the jack extension system 16 (FIG. 3) to extend at least one of the jacks 14. Control system 20 will continue to monitor the pitch and/or roll angles 26 and 30 as the jack 14 is extended. Once the monitored pitch and/or roll angle 26 and/or 30 has been exceeded, as determined at step 52, control system 20 will provide to jack extension system 16 an indication that the jack 14 has contacted the ground 18. See step 54. Thereafter, control system 20 may instruct jack extension system 16 to terminate jack extension at step 56.

Control system 20 may repeat process 34 as necessary for each jack 14 that is to be extended, except that the initial pitch and roll angles 26 and 30 need only be determined once. After all of the jacks 14 have been extended so that they are in firm contact with the ground 18, jack control system 16 may further extend the jacks 14 until the drill rig 12 has been leveled or has otherwise achieved the desired attitude. In this regard, jack control system 16 may interface with or utilize an attitude control system (not shown). However, since such subsequent leveling processes, as well as systems for performing such leveling processes, are well-known in the art and are not required to understand or practice the present invention, such leveling processes and systems therefor will not be described in further detail herein.

Figure 5:
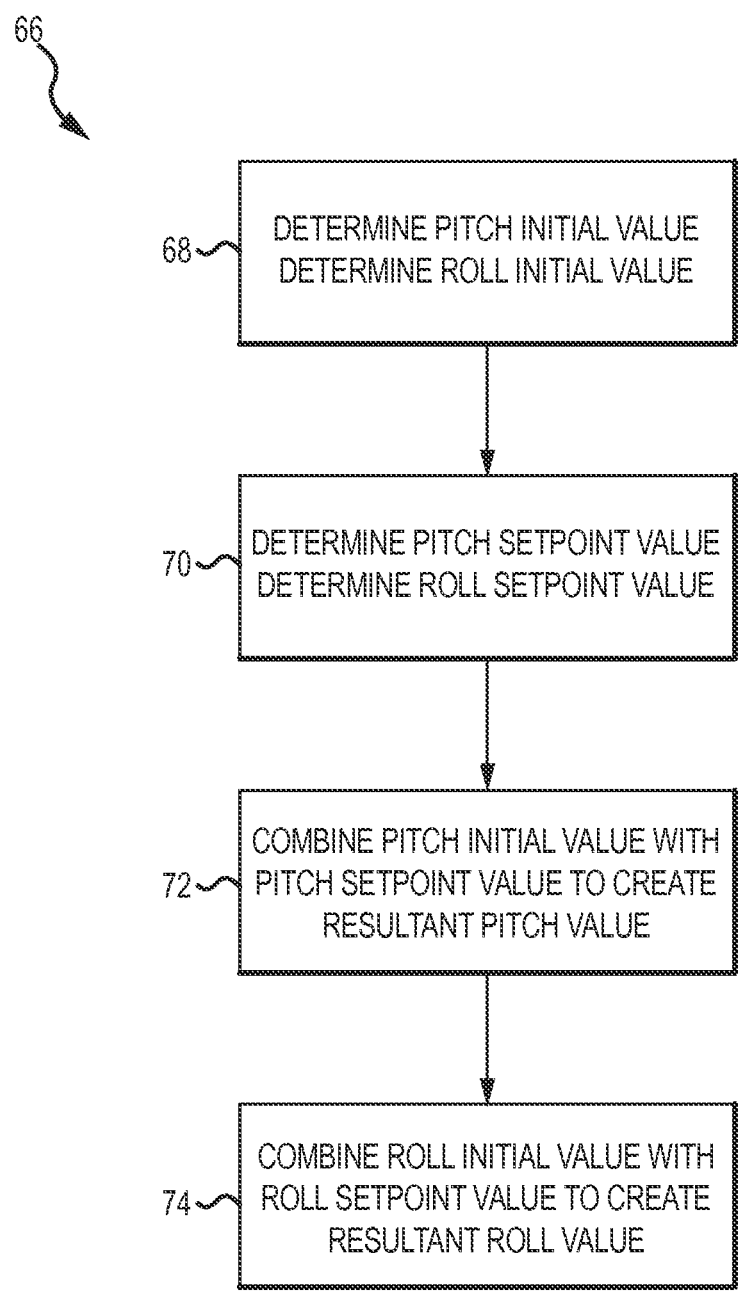
FIG. 5 is a flow chart of a method for determining a resultant pitch value and a resultant roll value.

As briefly described above, step 52 of process 36 illustrated in FIG. 4 involves a determination of whether the monitored pitch and/or roll angles 26 and/or 30 exceed corresponding setpoint values. A method 66 for making this determination is illustrated in FIG. 5. A first step 68 in the method 66 is to determine the initial pitch value and the initial roll value. These are identical to the initial pitch angle 26 and the initial roll angle 30 determined in step 35 of method 34. That is, the initial pitch value is set equal to the initial pitch angle 26, whereas the initial roll value is set equal to the initial roll angle 30. In step 70, corresponding pitch and roll setpoint values are determined. As used herein, a setpoint value is that value that corresponds to the angle change required to ensure that the jack 14 has contacted the ground. Thus, the pitch setpoint value corresponds to the pitch angle change caused by jack contact with the ground 18, whereas the roll setpoint value corresponds to the roll angle change caused by jack contact with the ground 18.

The pitch and roll setpoints may be experimentally determined for the particular vehicle on which the system 10 is to be used. Alternatively, the pitch and roll setpoints may be determined analytically or by some other process. By way of example, in one embodiment, the pitch and roll setpoints are determined to be 0.1 degree, although other setpoint values may be used, as would become apparent to persons having ordinary skill in the art after having become familiar with the teachings provided herein. Consequently, the present invention should not be regarded as limited to any particular setpoint value. In addition, the pitch and roll setpoint values need not be identical to one another, but instead could comprise different values.

The next step 72 in process 66 involves combining (i.e., by addition or subtraction) the pitch initial value with the pitch setpoint value to create a resultant pitch value. Whether the pitch setpoint value is added to or subtracted from the pitch initial value depends on the particular sign convention used for the pitch angle 26 and on whether the particular jack or jacks 14 that are to be extended will increase the pitch angle 26 or decrease the pitch angle 26.

For example, and referring back now to FIG. 1, in an embodiment wherein the pitch angle is deemed to be zero when the drill rig 12 is level or aligned with the horizontal, and positive when the drill rig 12 is tilted or pitched toward the non-drill end 42, and wherein the jacks 14 being extended are the non-drill end jacks 38 and 40, then the pitch setpoint value is subtracted from the pitch initial value to create the resultant pitch value. Stated another way, the resultant pitch value is determined by subtracting the pitch setpoint value from the pitch initial value. On the other hand, if either one or both of the drill end jacks 44 and 46 are being extended, then the resultant pitch value is determined by adding the pitch setpoint value to the initial pitch value.

Step 74 of process 66 involves a similar combination (i.e., by addition or subtraction) of the roll initial value and the roll setpoint value to create a resultant roll value. Here again, whether the roll setpoint value is added to or subtracted from the roll initial value depends on the particular sign convention used for the roll angle 30 and on whether the particular jack or jacks 14 being extended will increase the roll angle 30 or decrease the roll angle 30.

For example, and referring to FIG. 2, in an embodiment wherein the roll angle is deemed to be zero when the drill rig 12 is level (i.e., aligned with the horizontal), and positive when the drill rig 12 is tilted or rolled toward the non-cab side 41, and wherein the jacks 14 being extended are the non-cab side jacks 40 and 46, then the roll setpoint value is subtracted from the roll initial value to create the resultant roll value. That is, the resultant roll value is determined by subtracting the roll setpoint value from the roll initial value. On the other hand, if either one or both of the cab side jacks 38 and 44 are being extended, then the resultant roll value is determined by adding the roll setpoint value to the initial roll value.

As briefly mentioned above, the particular details of the method 34 used to detect when the various jacks 14 have contacted the ground 18 may vary depending on which of the particular jacks 14 are to be extended, whether the jack(s) being extended is a single jack 14 or a pair of jacks 14, and on the particular sign convention used for the pitch and roll angles 26 and 30.

Figure 6:
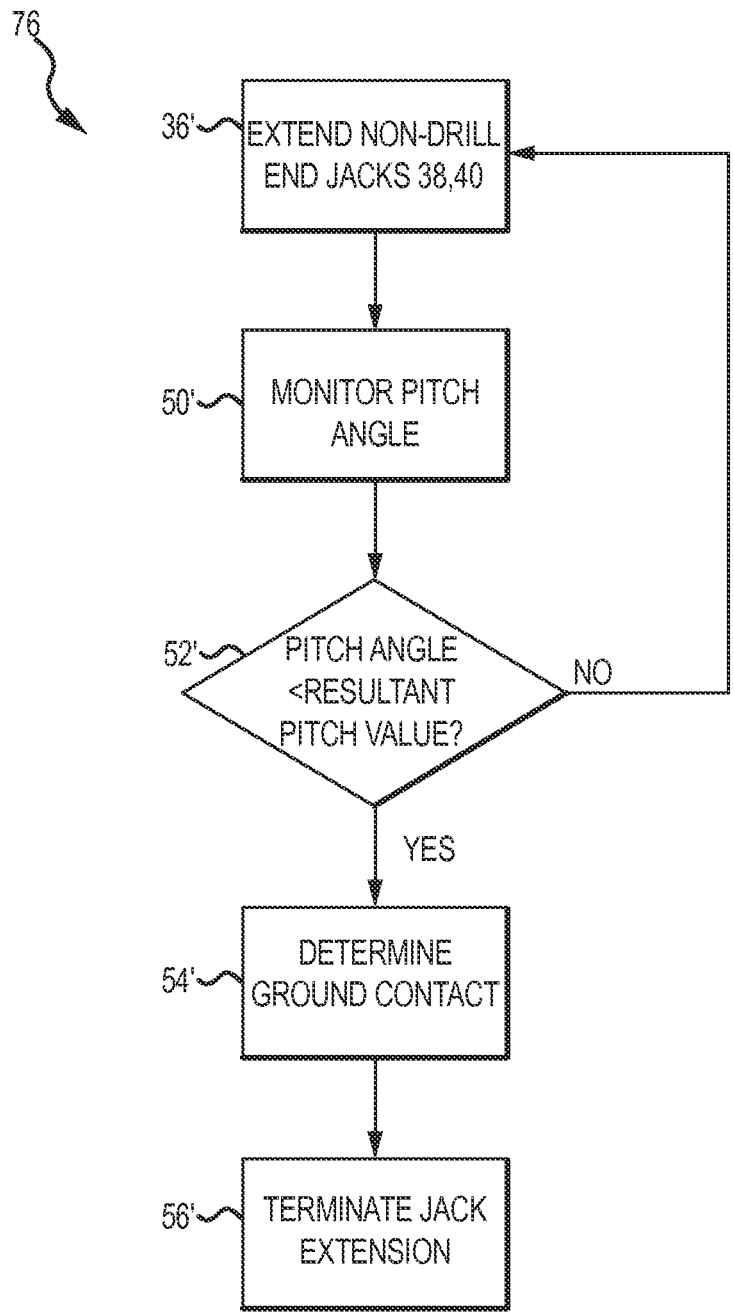
FIG. 6 is a flow chart of a method for operating the non-drill end jacks of the drill rig illustrated in FIG. 1.

For example, and with reference now primarily to FIG. 6, a process 76 for extending the non-drill end jacks 38 and 40 (FIG. 3) may be utilized where both non-drill end jacks 38 and 40 are extended together. That is, process 76 may be used to advantage in systems wherein the non-drill end jacks 38 and 40 are on the same hydraulic circuit and controlled by a single valve. Accordingly, process 76 may be regarded as a subset or variation of a portion of the process depicted in FIG. 4, but specifically configured for determining when the non-drill end jacks 38 and 40 (which extend together) have contacted the ground 18. Other processes (e.g., 78 and 80) are specifically configured for the drill end jacks 44 and 46 and will be described in greater detail below.

It should also be noted that process 76 is performed after the control system 20 has sensed the initial pitch and roll angles (e.g., in step 35, FIG. 4), and after control system 20 has performed process 66 (FIG. 5) to determine the resultant pitch and roll values. In this regard it should be noted that, because process 76 involves only the monitoring of the pitch angle 26, it is possible to carry out process 76 with only the values for the initial pitch angle 26, pitch setpoint value, and consequent resultant pitch value, although in most embodiments, the respective roll values will have been determined as well. In the particular embodiment shown and described herein, and in accordance with the teachings provided herein, the resultant pitch value for process 76 that involves the extension of the non-drill end jacks 38 and 40 is determined by subtracting the pitch setpoint value from the initial pitch value.

Still referring to FIG. 6, control system 20 will begin extending the non-drill end jacks 38 and 40 at step 36', e.g., by providing the appropriate commands or instructions to the jack extension system 16. As mentioned, the non-drill end jacks 38 and 40 will be extended together and will generally contact the ground 18 simultaneously. During the extension process, control system 20 will monitor the pitch angle 26, e.g., at step 50', and compare the monitored pitch angle 26 with the resultant pitch value at step 52'. So long as the monitored pitch angle 26 is greater than the resultant pitch value, control system 20 will continue to perform steps 36', 50', and 52', as depicted in FIG. 6.

As soon as jacks 38 and 40 contact the ground 18, they will begin to reduce the pitch angle 26 of drill rig 12. That is, drill rig 12 will begin to pitch toward the drill end 48 of drill rig 12, gradually reducing the pitch angle 26. As soon as the pitch angle 26 falls below the resultant pitch value, as determined in step 52', control system 20 determines, at step 54', that the non-drill end jacks 38 and 40 have contacted the ground 18. Thereafter, control system 20 may instruct the jack extension system 16 to terminate the jack extension process at step 56'.

A slightly different process 78 may be used to extend the cab side jack 44. See FIG. 7. Process 78 differs from process 76 in that the cab side jack 44 is independently controlled in this particular embodiment and can be extended without extending any of the other jacks 14 on drill rig 12. Process 78 also differs from process 76 in that, once the jack 44 contacts the ground 18, further extension of jack 44 will tend to increase both the pitch angle 26 and the roll angle 30 of drill rig 12. See FIGS. 1 and 2. As was the case for process 76, process 78 is a subset or variation of a portion of the process 34 depicted in FIG. 4, but specifically configured for determining when the cab side jack 44 has contacted the ground 18.

Process 78 is also performed after the control system 20 has sensed the initial pitch and roll angles (e.g., in step 35, FIG. 4), and after control system 20 has performed process 66 (FIG. 5) to determine the resultant pitch and roll values, as already described. Because process involves the extension of the cab side jack 44, the resultant pitch value is determined by adding the pitch setpoint value to the initial pitch value. Likewise, the resultant roll value is determined by adding the roll setpoint value to the initial roll value.

With reference back now to FIG. 7, in step 36", control system 20 will begin extending the cab side jack 44 by providing the appropriate commands to the jack extension system 16. During the extension process, control system 20 will monitor, at step 50", both the pitch angle 26 and the roll angle 30 of drill rig 12. Both the pitch angle 26 and roll angle 30 are monitored during the extension process 50" to ensure that the ground detection indication is reliable in the event that both drill end jacks 44 and 46 contact the ground 18 at the same time. That is, in one embodiment, the control system 20 may be programmed or configured to extend both the drill end jacks 44 and 46 at the same time, although on independent basis. Alternatively, the jacks 44 and 46 could be extended one at a time.

Figure 7:
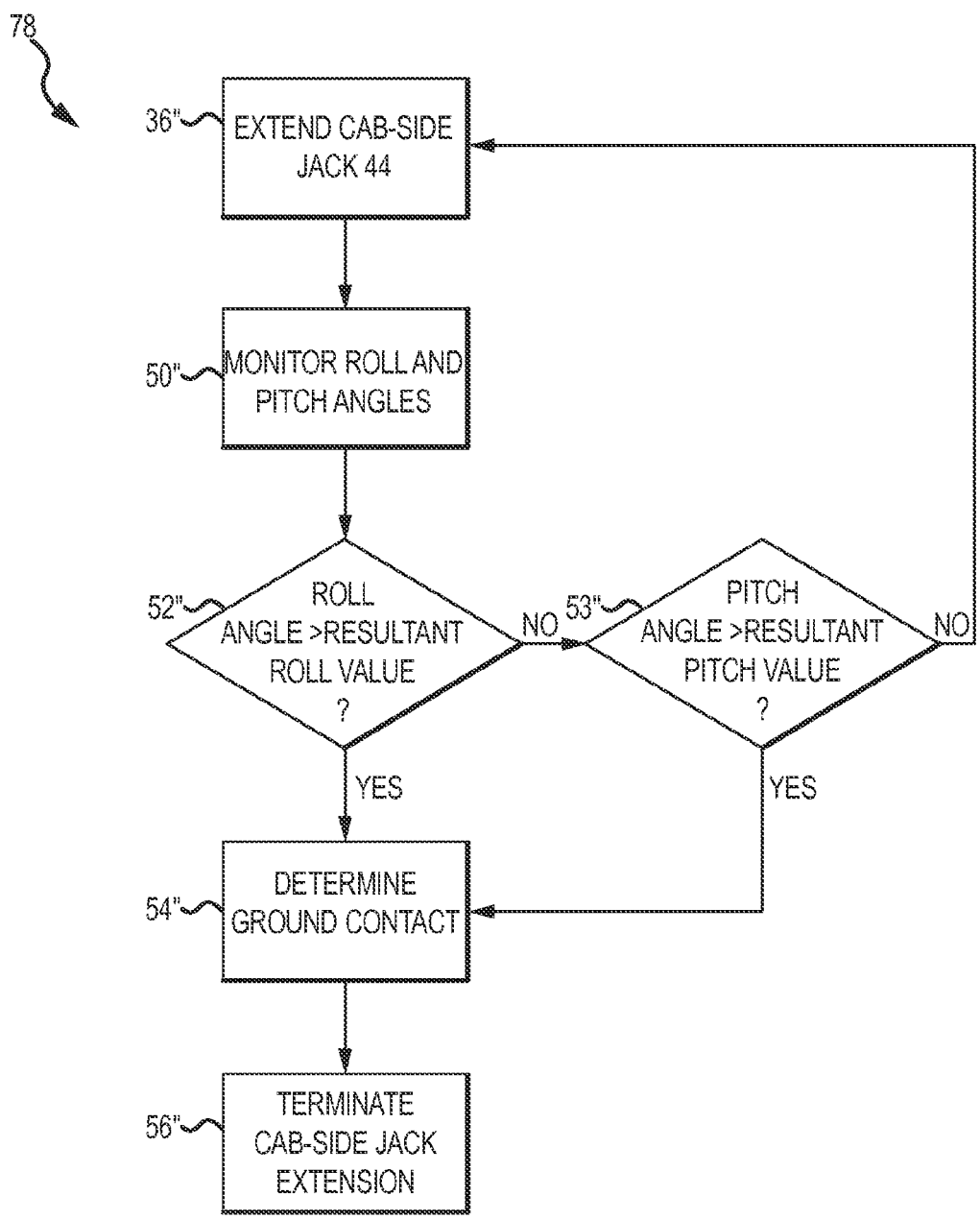
FIG. 7 is a flow chart of a method for operating the cab side jack of the drill rig.

Control system 20 compares the monitored roll angle 30 with the resultant roll value at step 52". Control system also compares the monitored pitch angle 26 with the resultant pitch value at step 53". So long as neither the monitored roll angle 30 nor the monitored pitch angle 26 exceeds the corresponding resultant value, control system 20 will continue to perform steps 36", 50" and 52" and 53", as depicted in FIG. 7.

As soon as cab side jack 44 contacts the ground 18, it will have the effect of increasing the pitch and/or roll angles 26 and/or 30 of drill rig 12. That is, drill rig 12 will begin to pitch toward the non-drill end 42 of drill rig 12, gradually increasing the pitch angle 26. See FIG. 1. In addition, drill rig 12 may begin to roll toward the non-cab side 41 of drill rig, gradually increasing the roll angle 30. See FIG. 2. As soon as either of the monitored roll angle exceeds the resultant roll value, as determined in step 52", or the monitored pitch angle 26 exceeds the resultant pitch value, as determined at step 53", control system 20 determines, e.g., at step 54", that the cab side jack 44 has contacted the ground 18. Thereafter, control system 20 may instruct the jack extension system 16 to terminate the jack extension process at step 56".

The present invention may implement yet another process 80 to extend the non-cab side jack 46. See FIG. 8. Process 80 differs from process 76 in that the non-cab side jack 46 is also independently controlled in this particular embodiment and can be extended without extending any of the other jacks 14 on drill rig 12. Process 80 also differs from processes 76 and 78 in that, once the jack 46 contacts the ground 18, further extension of jack 46 will tend to increase the pitch angle 26, but decrease the roll angle 30 of drill rig 12. See also FIGS. 1 and 2. Therefore, and as was the case for processes 76 and 78, process 80 may be regarded as a subset or variation of a portion of the process 34 depicted in FIG. 4, but specifically configured for determining when the non-cab side jack 46 has contacted the ground 18.

Like processes 76 and 78, process 80 is also performed after the control system 20 has sensed the initial pitch and roll angles (e.g., in step 35, FIG. 4), and after control system 20 has performed process 66 (FIG. 5) to determine the resultant pitch and roll values. However, because process 80 involves the extension of the non-cab side jack 46, the resultant pitch value is determined by adding the pitch setpoint value to the initial pitch value, whereas the resultant roll value is determined by subtracting the roll setpoint value from the initial roll value.

Referring back to FIG. 8, control system 20 will begin extending the non-cab side jack 46 in step 36''' by providing the appropriate commands to the jack extension system 16. During the extension process, control system 20 will monitor, at step 50''', both the pitch angle 26 and the roll angle 30 of drill rig 12. Both the pitch angle 26 and roll angle 30 are monitored during the extension process 50''' to ensure that the ground detection indication is reliable in the event that both drill end jacks 44 and 46 contact the ground 18 at the same time.

Control system 20 compares the monitored roll angle 30 with the resultant roll value at step 52''' and compares the monitored pitch angle 26 with the resultant pitch value at step 53'''. Control system 20 will continue to perform steps 36''', 50''', 52''', and 53''' for so long as the monitored roll angle 30 is greater than or equal to the resultant roll value and the monitored pitch angle 26 remains less than or equal to the corresponding resultant value. See FIG. 8.

As soon non-cab side jack 46 contacts the ground 18, it will have the effect of increasing the pitch angle 26, but decreasing the roll angle 30. That is, drill rig 12 will begin to pitch toward the non-drill end 42 of drill rig 12, gradually increasing the pitch angle 26. See FIG. 1. However, drill rig 12 may begin to roll toward the cab side 43 of drill rig 12, which will gradually decrease the roll angle 30. See FIG. 2. Control system 20 will proceed to step 54''' if the monitored roll angle falls below (i.e., becomes less than) the resultant roll value (e.g., at step 52'''). However, even if the monitored roll angle remains greater than or equal to the resultant roll value, control system 20 will still proceed to step 54''' if the monitored pitch angle exceeds the resultant pitch value (e.g., at step 53'''). Thereafter, control system 20 may instruct the jack extension system 16 to terminate the jack extension process at step 56".

The present invention may be operated as follows to determine when one or more of the jacks 14 on drill rig 12 have contacted the ground 18. After the ground contact determination has been made for each of the jacks 14, the jack extension system 16 may be further operated, if desired, to further extend the jacks 14 until the drill rig 12 has been leveled or has otherwise been raised to the desired attitude.

Assuming that the drill rig 12 has been positioned at the desired location, the system 10 may be activated to deploy the various jacks 14 until they have made firm ground contact. In one embodiment, the non-drill end jacks 38 and 40 are deployed first, followed by the cab side jack 44 and the non-cab side jack 46 in that order. Alternatively, other jack deployment sequences may be used. For example, in another embodiment, both the drill end jacks 44 and 46 may be deployed at approximately the same time as the non-drill end jacks 38 and 40 to speed the process.

With reference now primarily to FIGS. 4 and 5, the control system 20 may initiate process 34 by determining the initial pitch and roll angles 26 and 30 of drill rig 12. By way of example, and for the purposes of illustration, assume that the initial pitch angle 26 has been measured to be +10, i.e., the drill rig 12 is pitched toward the non-drill end 42 by an angle of 10 degrees. Assume also that the initial roll angle 30 has been measured to be +15. That is, the drill rig is rolled toward the non-cab side 41 by an angle of 15 degrees.

Having determined the initial pitch and roll angles 26 and 30, control system 20 may proceed to process 66 (FIG. 5) to create the resultant pitch values and the resultant roll values. During the first step 68 system 20 determines the pitch initial value and the roll initial value. In the embodiment shown and described herein, both the pitch and roll initial values are set equal to the initial pitch and roll angles 26 and 30. Thus, in this particular example, the pitch initial value will be set to +10, whereas the roll initial value will be set to +15.

The next step 70 in the process 66 involves the determination of the pitch setpoint value and the roll setpoint value. As described above, in one embodiment the pitch and roll setpoint values are determined in advance for the specific vehicle (e.g., drill rig 12) and are determined to be 0.1 each.

Step 72 combines the pitch initial value with the pitch setpoint value to create a resultant pitch value. As described above, whether the pitch setpoint value is added to or subtracted from the pitch initial value depends on the particular sign convention used for the pitch angle 26, as depicted in FIG. 1, as well as on the particular jack or jacks 14 that are to be extended, thus the particular extension process 76, 78, or 80 that will be involved. For example, for the particular sign convention utilized herein for the pitch angle 26, the resultant pitch value used for the extension of the non-drill end jacks 38 and 40 (i.e., involving extension process 76) will be the difference between the initial pitch value (e.g., +10 in this example) and pitch setpoint value (0.1 in this example). That is, the resultant pitch value utilized by extension process 76 will be 9.9.

In contrast, the resultant pitch value used for the extension of the drill end jacks 44 and 46 (i.e., involving extension processes 78 and 80, respectively), will be the sum of the initial pitch value and the pitch setpoint value. That is, in this example, the resultant pitch values used by both processes 78 and 80 will be 10.1.

Step 74 combines the roll initial value with the roll setpoint value to create a resultant pitch value. Here again, whether the roll setpoint value is added to or subtracted from the roll initial value depends on the particular sign convention used for the roll angle 30, as shown in FIG. 2, as well as on the particular jack or jacks that are to be extended, thus the particular extension process 78 or 80 that will be used. For example, for the particular sign convention utilized herein for the roll angle 30, the resultant roll value used for the extension of the non-cab side jack 46 (i.e., involving extension process 80) will be the difference between the initial roll value (e.g., +15 in this example) and roll setpoint value (0.1 in this example). That is, the resultant roll value utilized by extension process 80 will be 14.9.

The resultant roll value used for the extension of the cab side jack 44 (i.e., involving extension process 78), will be the sum of the initial roll value and the roll setpoint value. That is, in this example, the resultant roll value used by process 78 will be 15.1.

In extending the non-drill end jacks 38 and 40, the control system 20 will operate in accordance with process 76 illustrated in FIG. 6. Control system 20 may instruct the jack extension system 16 to begin extending the non-drill end jacks 38 and 40. As mentioned, in one embodiment, both non-drill end jacks 38 and 40 are connected to a single hydraulic circuit controlled by a single valve, so that they will extend together. As the jacks 38 and 40 are being extended, control system 20 continues to monitor the pitch angle 26 of drill rig 12 via the pitch sensor 22 (FIG. 3). Control system 20 will continue to extend the jacks 38 and 40 until the monitored pitch angle becomes less than the resultant pitch value. In this example, then, the control system 20 will extend the jacks 38 and 40 until the monitored pitch angle becomes less than 9.9. Control system 20 then determines that ground contact has occurred (i.e., at step 54') and may send the appropriate ground contact indication to the jack extension system 16. Thereafter, the extension of the jacks 38 and 40 may be terminated at step 56'.

Next, control system 20 may extend the cab side jack 44 by operating in accordance with process 78 illustrated in FIG. 7. In process 78, control system 20 instructs the jack extension system 16 to begin extending the cab side jack 44 at step 36". During the extension process, control system 20 will monitor both roll angle 30 and the pitch angle 26 of drill rig 12 during step 50". Control system 20 will continue extending jack 44 until the monitored roll angle becomes greater than the resultant roll value (step 52"), e.g., until the monitored roll angle exceeds 15.1, at which point control system 20 will determine that the jack 44 has contacted the ground 18 (i.e., at step 54"). However, even if the monitored roll angle has not yet exceeded 15.1, control system 20 will nevertheless determine that the jack 44 has contacted the ground 18 if the monitored pitch angle exceeds the resultant pitch value (step 53"), e.g., 10.1 in this example. Thereafter, the extension of jack 44 may be terminated at step 56".

Figure 8:
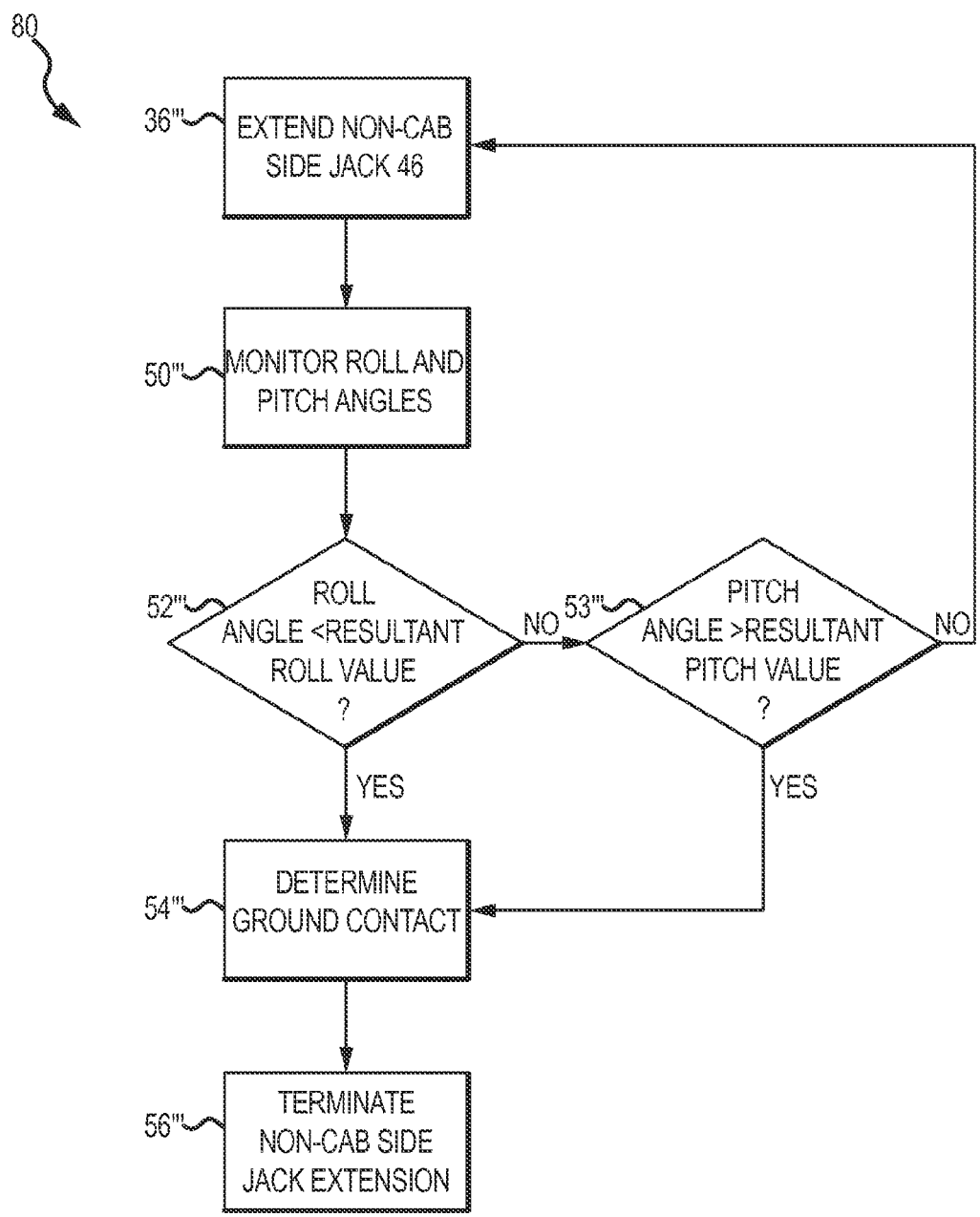
FIG. 8 is a flow chart of a method for operating the non-cab side jack of the drill rig.

Control system 20 may extend the non-cab side jack 46 by following process 80 illustrated in FIG. 8. At step 36'", control system 20 instructs the jack extension system 16 to begin extending the non-cab side jack 46. During the extension process, control system 20 will monitor both roll angle 30 and the pitch angle 26 of drill rig 12 during step 50'". Control system 20 will continue to extend non-cab side jack 46 until the monitored roll angle falls below the resultant roll value, e.g., until the monitored roll angle falls below 14.9, i.e., at step 52'". At this point (i.e., step 54'"), control system 20 determines that the non-cab side jack 46 has contacted the ground 18. However, even if the monitored roll angle has not yet fallen below 14.9 (i.e., as might be determined at step 52'"), control system 20 will nevertheless determine that the jack 46 has contacted the ground 18 if the monitored pitch angle exceeds the resultant pitch value of 10.1 (in this example), at step 53'". Thereafter, the extension of non-cab side jack 46 may be terminated at step 56'".

After having completed these processes, all of the jacks 14 will be in firm contact with the ground 18. Thereafter, jack extension system 18 may be further operated if required or desired to further extend the various jacks 14 until the drill rig 12 has been elevated to a fully level position or has otherwise lifted to the desired attitude.

Having herein set forth preferred embodiments of the present invention, it is anticipated that suitable modifications can be made thereto which will nonetheless remain within the scope of the invention. The invention shall therefore only be construed in accordance with the following claims:

What is claimed is:

1. A system for determining when one or more jacks on a vehicle have contacted the ground, comprising:

a pitch sensor operatively associated with the vehicle, said pitch sensor sensing an initial pitch angle and a sensed pitch angle of the vehicle;

a roll sensor operatively associated with the vehicle, said roll sensor sensing an initial roll angle and a sensed roll angle of the vehicle;

a jack extension system operatively associated with the jacks, said jack extension system extending and retracting the one or more jacks on the vehicle; and a control system operatively associated with said pitch sensor, said roll sensor, and said jack extension system, said control system monitoring said pitch and roll sensors to determine the sensed pitch and sensed roll angles of the vehicle, said control system operating the jack extension system to lower the jacks to the ground, said control system determining that the jacks have contacted the ground based on changes detected in the sensed pitch and sensed roll angles using the initial pitch and initial roll angles of the vehicle.

2. The system of claim 1, wherein said control system verifies proper operation of said pitch sensor and said roll sensor prior to said extending.

3. The system of claim 1, wherein said jacks comprise at least a first jack mounted to a first end of the vehicle and a pair of jacks mounted to a second end of the vehicle, and said control system operates the jack extension system to lower the pair of jacks to the ground substantially simultaneously.

\* \* \* \* \*